April 5, 1949.　　　　　P. ORR　　　　　2,466,266
HYDRODYNAMIC COUPLING
Filed March 8, 1947
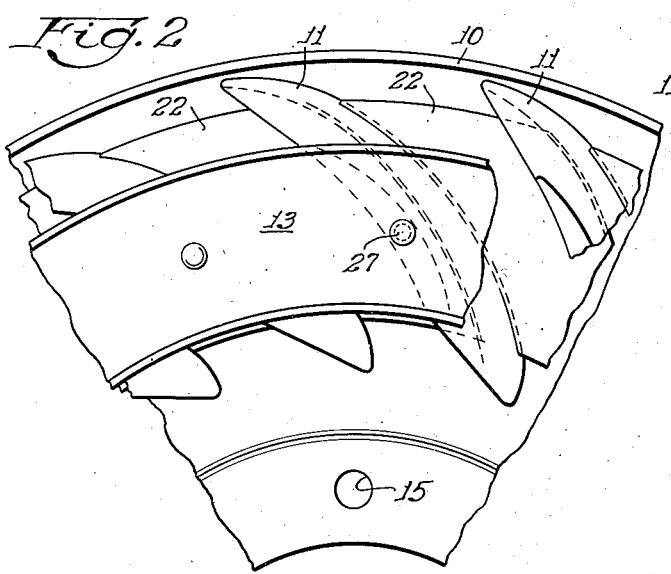
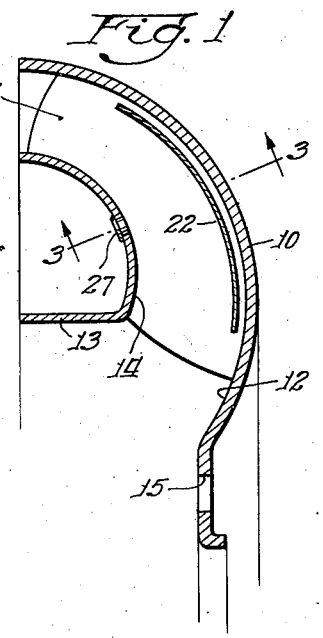
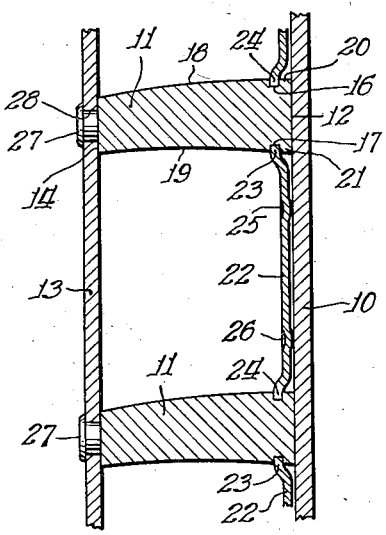
Inventor:
Palmer Orr Patented Apr. 5, 1949

2,466,266

UNITED STATES PATENT OFFICE 2,466,266

HYDRODYNAMIC COUPLING

Palmer Orr, Muncie, Ind., assignor to Borg-Warner Corporation, Chicago, Ill., a corporation of Illinois Application March 8, 1947, Serial No. 733,293

3 Claims. (Cl. 103—115)

My invention relates to hydrodynamic coupling devices and more particularly to such coupling devices which function to multiply the torque between an input and an output shaft.

Hydrodynamic coupling devices generally comprise a plurality of vaned members including a driving member and a driven member, the drive between which is through a body of liquid. The vanes of these members impart energy to and receive energy from the body of liquid. A fluid coupling which is not intended to multiply torque generally includes only two vaned members while a hydrodynamic torque converter includes at least three vaned members, a stator member which has a reaction force impressed thereon by the fluid and is held from rotation being the third member. Such hydrodynamic torque converters are shown, for example, in Schneider et al. Patent No. 2,306,758 and Schneider et al. Patent No. 2,333,680.

Considerable difficulty has been experienced in the past in assembling the hydrodynamic coupling devices and in particular these devices of the torque converter type. The vanes in the driving and driven members of the non-torque converting type are generally flat pieces of metal which are relatively simple to attach to the casings of these members; however, the vanes in the members of a torque converting hydrodynamic device generally are curved and differ in thickness throughout their length and breadth. The vanes of a torque converting hydrodynamic device may be made expeditiously by casting and are preferably of a light weight metal such as aluminum; however, such vanes cannot be welded very well to the casings of the vaned members, which are preferably steel stampings, in order to simply fasten the vanes in the members.

It is an object of my invention to provide an improved arrangement for attaching the vanes in the members of a hydrodynamic coupling device, and it is more specifically an object to provide such an arrangement which is particularly advantageous for use with the curved vanes of different cross-sectional thickness used in a torque converter.

It is another object of the invention to provide such an arrangement by means of which the vanes may be mechanically attached to a hydrodynamic coupling element without the necessity of welding the vanes thereto.

It is still more particularly an object of the invention to utilize vanes which are provided with sidewardly extending flanges adjacent the casing of the coupling member and to provide lugs which extend over the flanges and are fixed with respect to the casing for thus mechanically fixing the vanes with respect to the casing.

It is more specifically an object of the invention to form the above-mentioned flanges by means of elongated grooves formed in the side faces of the vanes and to provide sheet metal spacers extending between adjacent ones of the vanes and entering the grooves to thereby function as lugs for holding the vanes in place. It is contemplated that the spacers may be welded to the casing.

The invention consists of the novel constructions, arrangements and devices to be hereinafter described and claimed for carrying out the above stated objects and such other objects as will appear from the following description of a certain preferred embodiment illustrated with reference to the accompanying drawing, wherein:

Fig. 1 is a cross-sectional view of a portion of an impeller or driving member of a hydrodynamic torque converter illustrating one embodiment of the invention;

Fig. 2 is an elevational view of the impeller as seen from the left in Fig. 1 or from the inner side of the impeller; and Fig. 3 is a sectional view on an enlarged scale taken on line 3—3 of Fig. 1 in the direction indicated.

Like characters of reference designate like parts in the several views.

Referring now to the drawing, the illustrated hydrodynamic torque converter impeller element or member is seen to comprise an outer casing member 10 which is a hollow shell. A plurality of impeller blades or vanes 11 are disposed within the casing member and are in contact with the member at the base edges 12 of the vanes. An inner core ring 13 which is also a hollow shell is disposed in contact with the vanes on their opposite edges 14. The casing member 10 is provided with a plurality of openings 15 near its central margin by means of which the impeller element may be attached to a suitable hub (not shown).

It will be understood that the casing member 10 and the core ring 13 are both annular and are complete rings, although only portions of the casing and core are illustrated in the drawing. The vanes 11 are equally spaced and extend completely around the casing and core ring. It will be noted that the vanes 11 are curved and have a varying and substantial thickness, and the vanes are of such form that the illustrated hydrodynamic coupling element is adapted to constitute an impeller or driving element in a torque converter, such as is, for example, shown in the two Schneider patents hereinbefore mentioned. It will be understood that the illustrated impeller element is adapted to be used in connection with a vaned driven element and a vaned stator element, which constitute the three elements ordinarily found in a hydrodynamic torque converter, with the impeller element functioning to impart energy to a body of liquid in the torque converter, the driven or runner element receiving energy from the liquid and the stator element being held from rotation and functioning as a reaction element to change the direction of flow of the liquid so that the coupling functions to multiply the torque.

The casing 10 and core ring 13 are preferably steel stampings, and in view of the fact that these two parts need not have any substantial thickness, they may be made as light as desired. The vanes 11, which have substantial thickness and which would have appreciable weight if made from steel, are preferably made of a light material such as aluminum. A simple arrangement for fixing vanes with respect to their casing members is by means of welding; however, when the vanes and casing members are of unlike metals which do not weld readily, this arrangement has not proved satisfactory. My invention provides an improved arrangement for fixing vanes with respect to the casing member on which they are positioned which includes spacers between adjacent ones of the vanes that fit over flanges on the vanes, the spacers having been fixed, as by welding, to the casing member. This arrangement will now be described in detail.

Each of the vanes 11 is provided with grooves 16 and 17 in its side faces 18 and 19, respectively. The grooves 16 and 17 form flanges 20 and 21 respectively on the base edge 12 of the vane. A sheet metal spacer 22 is disposed between adjacent ones of the vanes 11, and the ends 23 and 24 of the spacer extend into the grooves 17 and 16, respectively, in these vanes as shown. The ends of these spacers thus in effect constitute flanges which overlie the flanges 21 and 20 on the base edges of the vanes. The spacers 22 are welded to the casing member 10, as at 25 and 26, and these spacers being thus fixed to the casing member 10 function to also fix the vanes 11 with respect to the member 10. The vanes 11 are provided with rivets 27 on their edges 14, and these rivets extend through openings 28 provided in the core ring 13 and are headed over so as to fix the vanes with respect to the core ring.

In assembling the illustrated impeller element, the vanes 11 are positioned one by one with their base edges 12 in contact with the inner surface of the casing member 10, and the spacers are put between the vanes to properly locate them. The spacers 22 are then welded to the casing member as at 25 and 26 to thereby fix the vanes with respect to the casing member. The core ring 13 is then put in place with the rivets 27 extending through the holes 28 in the core ring, and the rivets are then headed over to fix the core ring with respect to the vanes, and the assembly is then complete.

It will be apparent that the spacers 22 fitting in the grooves 16 and 17 advantageously function not only to properly locate the vanes 11 in the outer casing member 10, but also when fixed with respect to the casing member 10 function to fix the vanes with respect to the member 10. I thus provide a simple arrangement for locating and for mechanically fixing the vanes 11 with respect to the outer casing member 10.

I wish it to be understood that my invention is not to be limited to the specific constructions of hydrodynamic couplings which are shown and described, except only insofar as the claims may be so limited, as it will be apparent to those skilled in the art that changes may be made without departing from the principles of the invention. In particular, I wish it to be understood that the invention is not to be limited to torque converting couplings to the exclusion of non-torque converting couplings, unless the claims are so limited. Furthermore, I wish it to be understood that although the illustrated embodiment of the invention is shown in connection with an impeller element, the invention is not to be limited to an impeller element to the exclusion of driven and stator elements in a hydrodynamic coupling, unless the claims are so limited.

I claim:

1. In a hydrodynamic coupling element, the combination of a casing member, a vane on said member, said vane being provided with elongated grooves in opposite side faces thereof extending longitudinally of the vane, and a pair of sheet metal lugs fixed to said casing member and disposed on opposite sides of said vane and extending into said grooves for fixing the vane to the casing member.

2. In a hydrodynamic coupling element, the combination of a hollow annular casing member, a plurality of spaced vanes fitting within said member, each of said vanes being provided with elongated grooves in opposite side faces thereof extending longitudinally of the vane, and sheet metal spacers disposed between adjacent ones of said vanes and extending into said grooves, said spacers conforming in shape to the inner surface of said casing member and being fixed thereto for thereby fixing said vanes with respect to the casing member.

3. In a hydrodynamic coupling element, the combination of a hollow annular casing member, a plurality of spaced vanes fitting within said member, an annular core ring member fitting on said vanes and spaced from said casing member, means for fastening said vanes to said core ring member and including rivets fixed to the vanes and extending through openings in the core ring member, each of said vanes having grooves in opposite side faces thereof, and means for fixing the vanes with respect to said casing member and including sheet metal spacers having a substantially less thickness than the casing member and disposed between adjacent ones of said vanes and extending into said grooves, said spacers conforming in shape to the inner surface of said casing member and being fixed to the casing member for thereby fixing the vanes to the casing member.

PALMER ORR.

REFERENCES CITED

The following references are of record in the file of this patent:

UNITED STATES PATENTS

| Number | Name | Date |
|---|---|---|
| 1,032,287 | Kreher | July 9, 1912 |
| 2,295,926 | Boesger | Sept. 15, 1942 |

FOREIGN PATENTS

| Number | Country | Date |
|---|---|---|
| 365,817 | Great Britain | Jan. 28, 1932 |